(12) United States Patent
Lee et al.

(10) Patent No.: US 6,381,293 B1
(45) Date of Patent: Apr. 30, 2002

(54) APPARATUS AND METHOD FOR SERIAL DATA COMMUNICATION BETWEEN PLURALITY OF CHIPS IN A CHIP SET

(75) Inventors: David Lee, Hsinchu; Cheng-Wang Huang, Chupei, both of (TW)

(73) Assignee: United Microelectronics Corp., Hsinchu (TW)

(*) Notice: Subject to any disclaimer, the term of this patent is extended or adjusted under 35 U.S.C. 154(b) by 0 days.

(21) Appl. No.: 09/241,729

(22) Filed: Feb. 2, 1999

Related U.S. Application Data

(63) Continuation-in-part of application No. 08/626,948, filed on Apr. 3, 1996, now Pat. No. 5,963,609.

(51) Int. Cl.[7] .............................................. H04L 23/00
(52) U.S. Cl. ........................ 375/377; 713/400; 713/600
(58) Field of Search ................................. 375/354, 377, 375/371, 372, 356, 219, 220; 370/359, 503, 507; 713/400, 500, 600

(56) References Cited

U.S. PATENT DOCUMENTS 5,373,204 A * 12/1994 Muramatsu et al.
5,438,665 A * 8/1995 Taniai et al.

* cited by examiner

Primary Examiner—Jean Corrielus

(57) ABSTRACT

An apparatus for serial data communication between a plurality of IC chips with a reduced number of inter-chip signal lines. In the apparatus, one IC chip acts as a master, while the other chip(s) are slaved to it. In response to conditions internal to the master chip or in response to a request from at least one of the slave chips, the master chip generates a transfer control signal and a synchronization clock signal. The transfer control signal defines a transfer phase during which data transfer among the chips can take place. The chips take turns sending and receiving data in a multiplexed fashion. with sending and receiving parties designated by a count of synchronization clock signal cycles. The synchronization clock signal is generated at a high frequency, to allow fast data transfer.

26 Claims, 5 Drawing Sheets

APPARATUS AND METHOD FOR SERIAL DATA COMMUNICATION BETWEEN PLURALITY OF CHIPS IN A CHIP SET

CROSS-REFERENCE TO RELATED APPLICATION

This is a continuation-in-part of U.S. patent application Ser. No. 08/626,948 filed Apr. 3, 1996 now U.S. Pat. No. 5,963,609.

BACKGROUND OF THE INVENTION

1. Field of the Invention

The invention relates to data communication, and more particularly, to an apparatus for serial data communication among a plurality of integrated circuit ("IC") chips which allows a reduced number of signal lines to be interconnected among the IC chips.

2. Description of the Related Art

In a chip set that includes several IC chips, a number of signal lines are often interconnected among the IC chips for data transmission among the same. The provision of a large number of signal lines in a chip set has several drawbacks. First, the size of the package increases in proportion to the number of signal lines. Second, the complexity of assembly of the chip set increases as the number of signal lines increases. Third, manufacturing cost is increased due to an increase in the chip area required to accommodate the large number of signal lines.

It is a customary practice to arrange the signal lines in parallel between two separate IC chips in order to attain a high data transmission rate. However, in order to minimumize the number of signal lines among a large number of IC chips, there are two conventional methods that can be used. The first method includes the use of multiplexers with time-share sampling, and the second method includes the use of serial transmission techniques. Examples of systems using these two methods are illustrated in FIG. 1 and FIG. 2.

FIG. 1 illustrates an exemplary system using the method of multiplexing with time-share sampling, on a chip set that includes a first IC chip 10 and a second IC chip 11. The first IC chip 10 includes a control unit 13, a demultiplexer 14, and four identical, independent data receiving units 120, 121, 122, 123. The second IC chip 11 includes a multiplexer 16 and four identical data transmitting units 150, 151, 152, 153 associated respectively with the data receiving units 120, 121, 122, 123 in the first IC chip 10.

In the first IC chip 10, the data receiving units 120, 121, 122, 123 are wire connected to the demultiplexer 14 by the buses 17a, 17b, 17c, and 17d, respectively. In the second IC chip 11, the data transmitting units 150, 151, 152, 153 are wire connected to the multiplexer 16 by means of the buses 17f, 17g, 17h, and 17i, respectively. The demultiplexer 14 is wire connected to the multiplexer 16 by the bus 17e. Moreover. the demultiplexer 14 in the first IC chip 10 is wire connected to the control unit 13, which is also in the first IC chip 10, by the internal bus 18, while the multiplexer 16 in the second IC chip 11 is wire connected to the control unit 13 by the external bus 19. Since there are four source devices (i.e., the data transmitting units 150, 151, 152, 153) that are to be multiplexed by the multiplexer 16 for data transmission, and since there are four destination devices (i.e., the data receiving units 120, 121, 122, 123) that are to be selected by the demultiplexer 14 for reception of data from the source devices, therefore, the buses 18, 19 each consist of two signal lines from the control unit 13, serving to transmit a set of two control bits respectively to the multiplexer 16 and to the demultiplexer 14 for selecting a respective one of the four source devices. When a certain pair of data transmitting units and data receiving units is selected to use the common bus 17e for data transmission, for example, the second data transmitting unit 151 and the associated data receiving unit 121, the control unit 13 generates two control bits which are sent respectively over the bus 18 and the bus 19 to the demultiplexer 14 and the multiplexer 16. In response, in the first IC chip 10 the demultiplexer 14 connects the bus 17b to the receive end of the common bus 17e and, in the second IC chip 11 the multiplexer 16 connects the bus 17g to the transmit end of the common bus 17e.

There are, however, two drawbacks to the system configuration of FIG. 1. First, the clock rate of the control bits from the control unit 13 should be much faster than the data transmission rate in order to allow fast switching between the four multiplexed devices. Second, power consumption in the chip set is very high.

FIG. 2 illustrates an exemplary system using a serial transmission method on a chip set that includes a first IC chip 20 and a second IC chip 21. A set of at least four signal lines 22, 23, 24, 25 is used for data transmission between the first IC chip 20 and the second IC chip 21. The signal line 22 allows the first IC chip 20 to transmit a Chip Select signal to the second IC chip 21; the signal line 23 allows the first IC chip 20 to transmit a Serial Clock signal to the second IC chip 21. The signal line 24 allows the second IC chip 21 to transmit serial binary data to the first IC chip 20; the signal line 25 allows the first IC chip 20 to transmit serial binary data to the second IC chip 21.

There are, however., two drawbacks to the system configuration of FIG. 2. First, the number of signal lines between the two IC chips 20, 21 is not minimumized since the data transmission between the two IC chips 20, 21 is carried out over two separate lines (i.e., the signal lines 24, 25) rather than one. Second, data communication between the two IC chips 20, 21 is under the control of a module in the first IC chip 20, and the second IC chip 21 is unable to issue any requests for data transmission. Therefore, the system configuration of FIG. 2 is not suitable for data communication among a large number of IC chips.

SUMMARY OF THE INVENTION

It is therefore an object of the invention to provide an apparatus for serial data communication using a reduced number of signal lines among a plurality of IC chips.

In accordance with the foregoing and other objects of the invention, a new and improved apparatus for serial data communication among a plurality of IC chips is provided. In the apparatus, one IC chip acts as a master, while the other chip(s) are slaved to the master. In response to conditions internal to the master chip, or in response to a request from at least one slave chip, the master chip generates a transfer control signal and a synchronization clock signal. The transfer control signal defines a transfer phase during which data transfer among the chips can take place. The chips take turns sending and receiving data in a multiplexed fashion, with sending and receiving parties designated by a count of synchronization clock signal cycles. The synchronization clock signal is generated at a high frequency, to allow fast data transfer. The data communication between the IC chips requires only a reduced number of signal lines, which allows the number of pins required for connection of the two IC chips, as well as manufacturing costs, to be significantly reduced.

Thus, the apparatus according to the invention includes means for generating a transfer request signal and means for generating a transfer control signal and a synchronization clock signal in response to the transfer request signal, wherein the synchronization clock signal has a plurality of cycle periods. The apparatus also includes means for counting the cycle periods of the synchronization clock signal to produce a cycle count. A data transmitting means is provided for transmitting data in response to the transfer control signal under control of the cycle count. A data receiving means receives the data transmitted by the data transmitting means in response to the transfer control signal also under the control of the cycle count.

According to a further aspect of the invention, the means for generating a transfer request signal includes a first transfer request signal generating means located on the first IC chip and a second transfer request signal generating means located on the second IC chip. The means for generating a transfer control signal and a synchronization clock signal is located on the first IC chip. The means for counting the cycle periods of the synchronization clock signal includes a first cycle period counting means located on the first IC chip and a second cycle period counting means located on the second IC chip. The data transmitting means includes a first data transmitting means located on the first IC chip and a second data transmitting means located on the second IC chip. The data receiving means includes a first data receiving means located on the first IC chip and a second data receiving means located on the second IC chip.

According to another aspect of the invention, the apparatus also includes means, responsive to the cycle count, for selecting between the first data transmitting means and the second data transmitting means and for enabling only the selected data transmitting means to transmit data, and further includes means, responsive to the cycle count, for selecting between the first data receiving means and the second data receiving means and for enabling only the selected data receiving means to receive data.

According to another particular embodiment of the invention, the first transfer request signal generating means and the first data transmitting means are included in a master output encoder, and the second transfer request signal generating means and the second data transmitting means is included in a slave output encoder. The means for generating a transfer control signal and a synchronization clock signal is included in a master control unit. The first data receiving means is included in a master input decoder. The second data receiving means is included in a slave input decoder. The master control unit further includes means for generating a master output control signal to control the master output encoder, and means for generating a master input control signal to control the master input decoder. The second IC chip further includes a slave control unit. The slave control unit includes means for generating a slave output control signal to control the slave output encoder, and means for generating a slave input control signal to control the slave input decoder.

According to still another particular embodiment of the invention, the apparatus comprises a transfer signal control line for transferring the transfer control signal from the master control unit to the slave control unit; a synchronization clock signal line for transferring the synchronization clock signal from master control unit to the slave control unit; and a data line for passing data from the master output encoder to the slave input decoder, and from the slave output encoder to the master input decoder.

A method according to the invention, by which the apparatus of the invention may be used, includes the steps of generating a transfer request signal; generating a transfer control signal and a synchronization clock signal in response to the transfer request signal, wherein the synchronization clock signal has a plurality of cycle periods; counting the plurality of cycle periods of the synchronization clock signal to produce a cycle count; transmitting data in response to the transfer control signal under control of the cycle count, and receiving the data transmitted by the data transmitting means in response to the transfer control signal under control of the cycle count.

According to a further aspect of the invention, the method also may include the steps of selecting, in response to the cycle count, between a first data transmitting means and a second data transmitting means and for enabling only the selected data transmitting means to transmit data; and selecting, in response to the cycle count, between a first data receiving means and a second data receiving means and for enabling only the selected data receiving means to receive.

The data communication between the IC chips requires only a reduced number of signal lines, which allows the number of pins required for connection of the two IC chips, as well as manufacturing costs, to be significantly reduced.

BRIEF DESCRIPTION OF THE DRAWINGS

The invention can be more fully understood from the following detailed description of the preferred embodiments with reference to the accompanying drawings, wherein.

DETAILED DESCRIPTION OF PREFERRED EMBODIMENT

Figure 1:
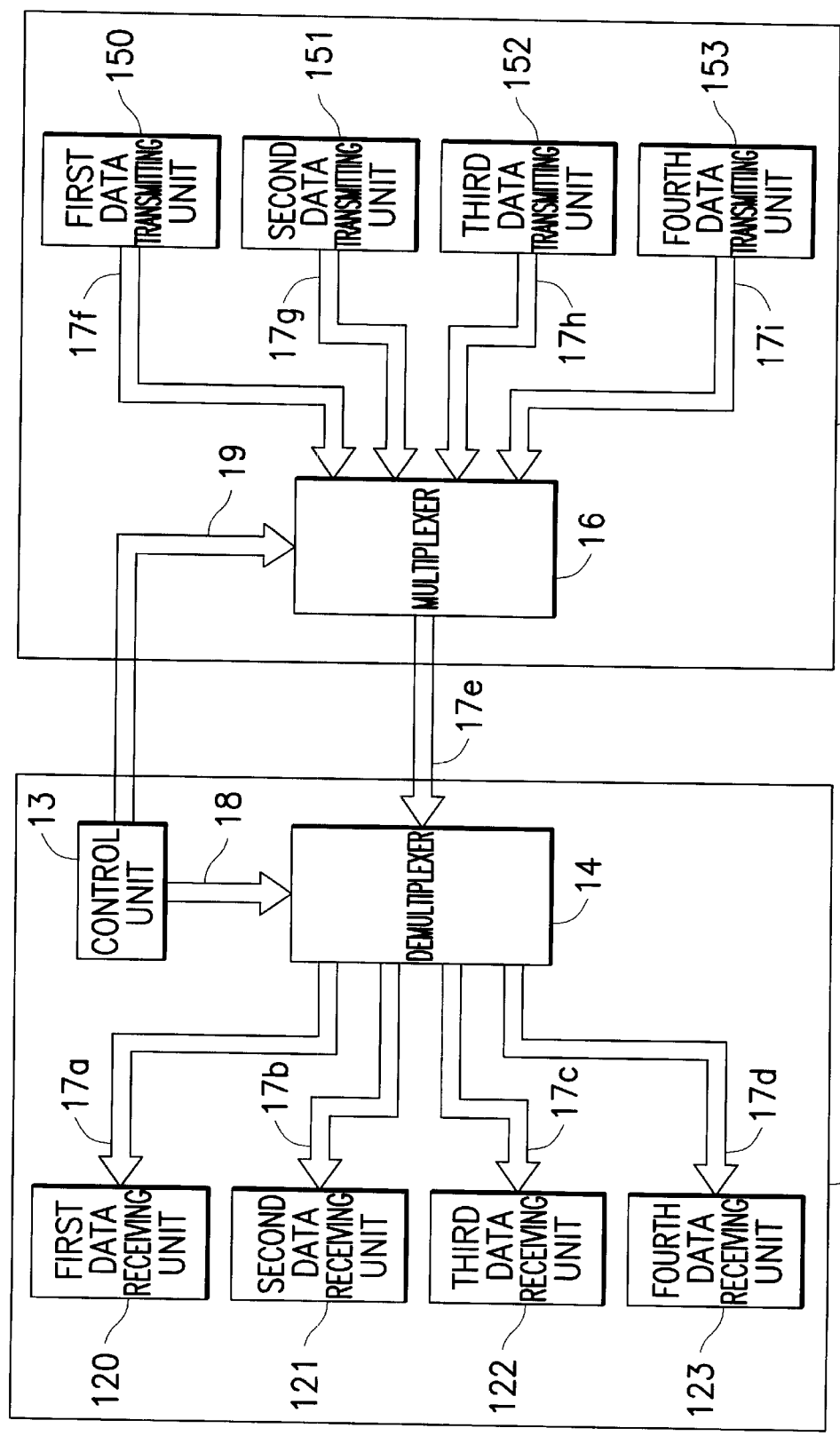
FIG. 1 is a schematic block diagram of a conventional system configuration for data communication between two IC chips by a method of multiplexing with time-share sampling.
Figure 2:
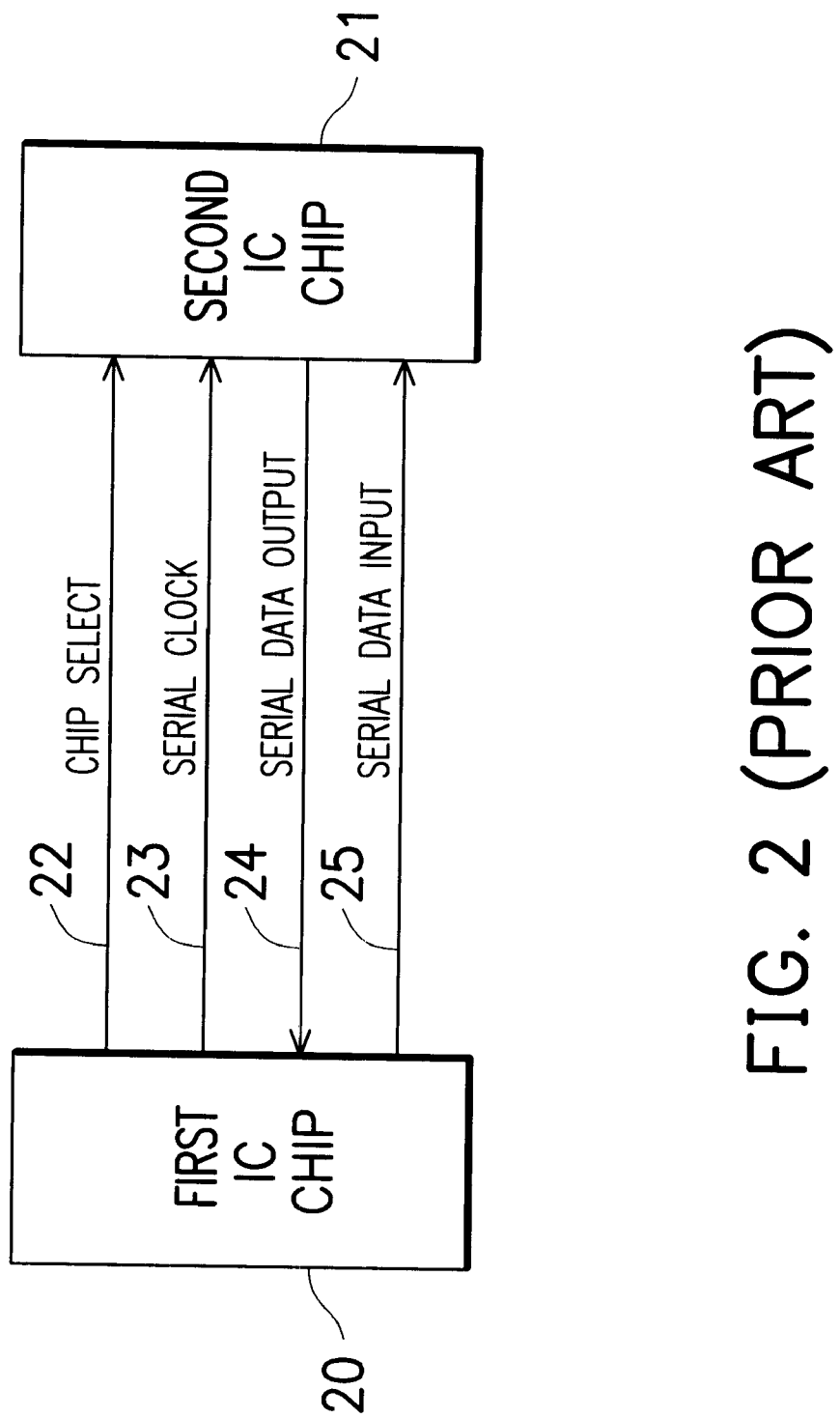
FIG. 2 is a schematic diagram of a conventional system configuration for data communication between two IC chips by a serial transmission method.
Figure 3:
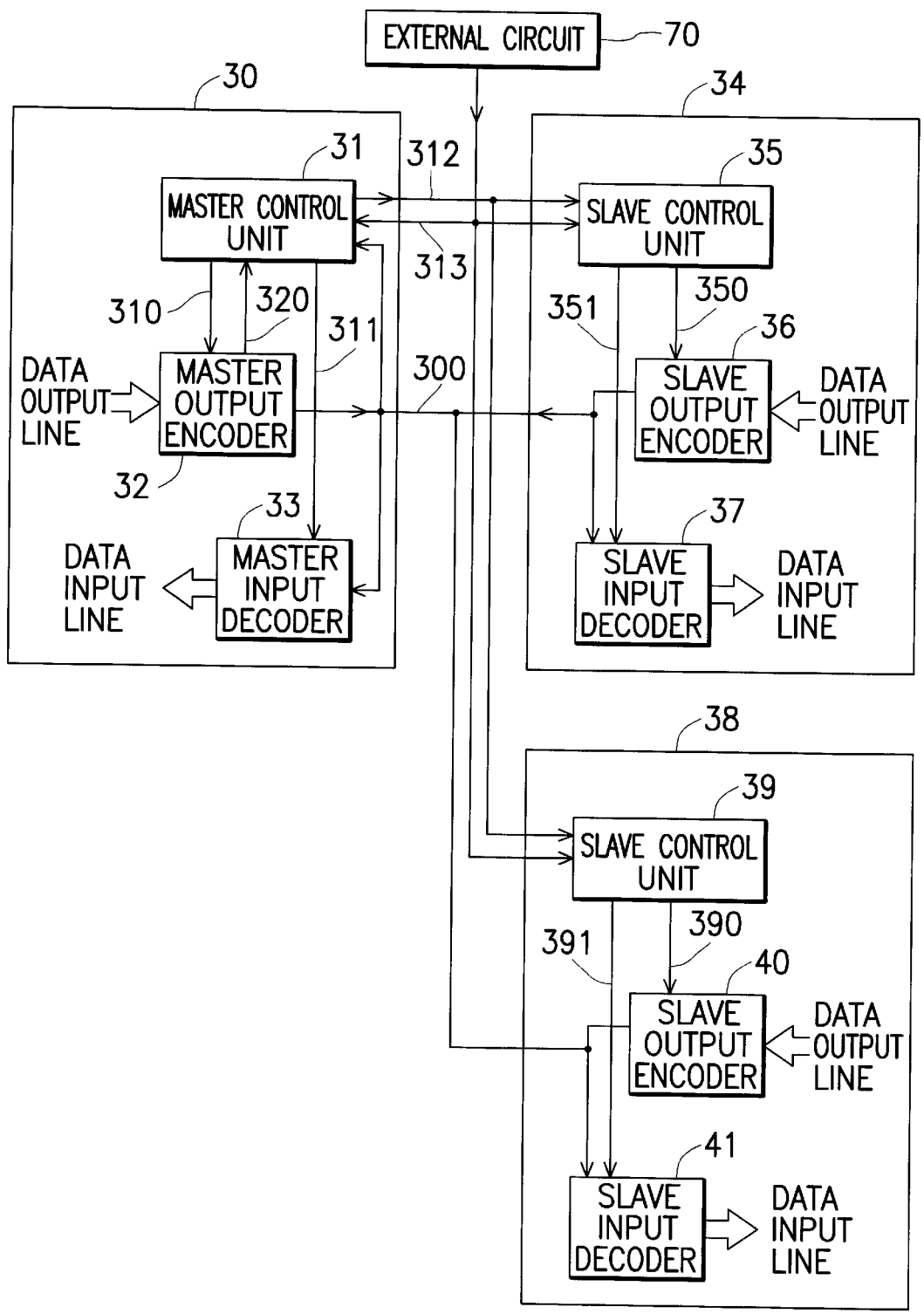
FIG. 3 is a schematic block diagram of an apparatus according to the invention for data communication among three IC chips in a chip set.

Referring to FIG. 3, there is shown a preferred embodiment of the apparatus according to the invention, which is used for data communication among three separate IC chips 30, 34, 38. It is to be understood that, broadly speaking, the invention can be used for data communication among a smaller or larger plural number of IC chips or among a plurality of source devices and a plurality of associated destination devices and that communication among three IC chips is described by way of example only.

According to the invention, one chip is designated a master chip and the remainder of the chips are slaved to it. In FIG. 3, the first IC chip 30 is designated the master, and the IC chips 34 and 38 are the slaves.

The first IC chip 30 includes a master control unit 31, a master output encoder 32, and a master input decoder 33; the second IC chip 34 includes a slave control unit 35, a slave output encoder 36, and a slave input decoder 37; and the third IC chip 38 includes a slave control unit 39, a slave output encoder 40, and a slave input decoder 41.

In the first IC chip 30, the master control unit 31 is wire connected to the master output encoder 32 by means of signal lines 310, 320 in which the signal line 310 is used to transmit a master output control signal from the master control unit 31 to the master output encoder 32, and the signal line 320 is used to transmit a transfer request signal in the reverse direction. In addition, the master control unit 31 is wire connected to the master input decoder 33 by means of a signal line 311 for transmitting a master input control signal to the master input decoder 33.

In the second IC chip 34, the slave control unit 35 is wire connected to the slave output encoder 36 by means of a signal line 350 which is used to transmit a slave output control signal to the slave output encoder 36. The slave control unit 35 is also wire connected to the slave input decoder 37 by means of a signal line 351 which is used to transmit a slave input control signal to the slave input decoder 37.

In the third IC chip 38, the slave control unit 39 is wire connected to the slave output encoder 40 by means of a signal line 390 which is used to transmit a slave output control signal to the slave output encoder 40. The slave control unit 39 also is wire connected to the slave input decoder 41 by means of a signal line 391 which is used to transmit a slave input control signal to the slave input decoder 41.

Among the three IC chips, the master control unit 31 is wire connected to the slave control unit 35 in the second IC chip 34 and to the slave control unit 39 in the third IC chip 38, by signal lines 312, 313 which are used to transmit a transfer control signal and a synchronization clock signal respectively. Moreover, a data line 300 is interconnected between the master control unit 31, the master output encoder 32, and the master input decoder 33 in the first IC chip 30, between the slave output encoder 36 and slave input decoder 37 in the second IC chip 34, and between the slave output encoder 40 and slave input decoder 41 in the third IC chip 38. The direction of data transmission via the data line 300 is indicated by the arrows therein. That is, the data line 300 is bi-directional between any two chips. On each chip, data on the data line flows towards the respective input decoders and out of the respective input decoders.

Figure 4:
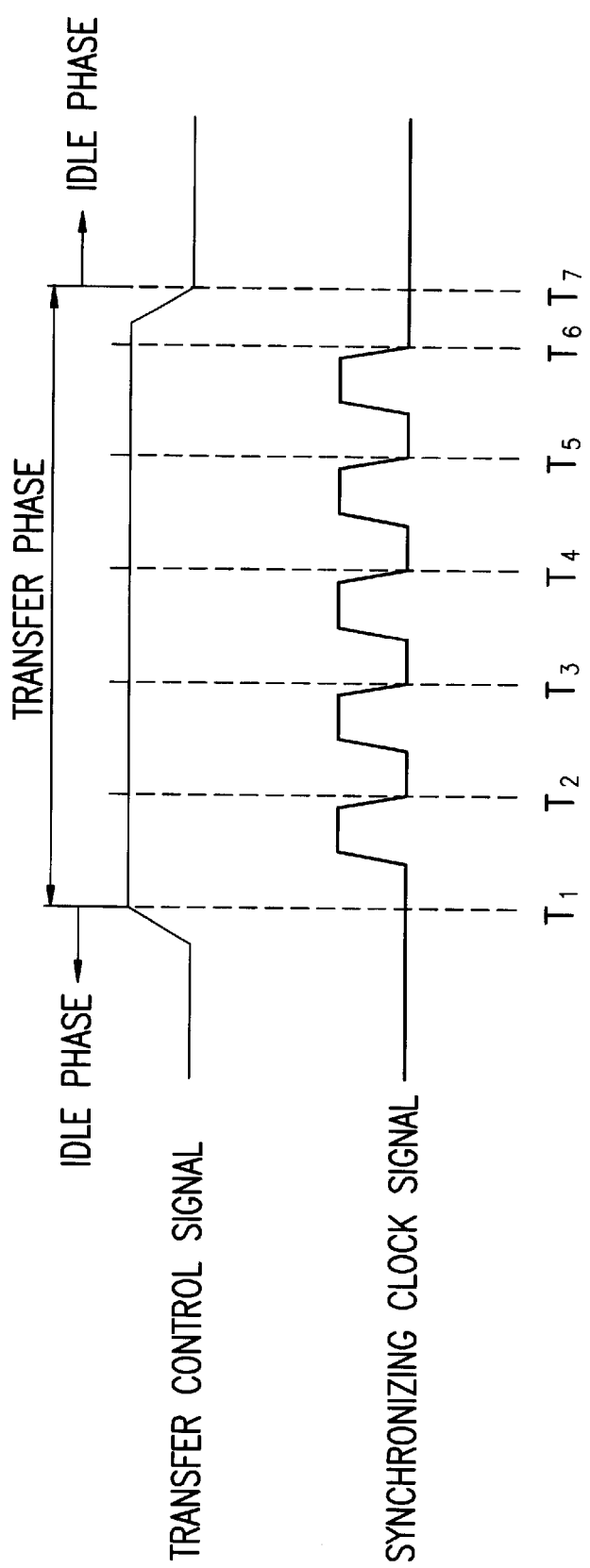
FIG. 4 is a waveform diagram of signals in the chip set of FIG. 3.

FIG. 4 shows a waveform diagram of the transfer control signal and synchronizing clock signal generated by the master control unit 31 in the first IC chip 30. The transfer control signal has two phases: a transfer phase indicative of data transmission in the chip set and an idle phase indicative of no data transmission in the chip set. A transfer phase is valid when the transfer control signal is asserted. During a valid transfer phase, one bit of data may be transmitted between chips during every cycle of the synchronization clock signal.

As illustrated in FIG. 4, during a transfer phase which starts at the time $T_1$ and ends at the time $T_7$, there are five intervals during which data can be transferred, i.e., the intervals $T_1-T_2$, $T_2-T_3$, $T_3-T_4$, $T_4-T_5$, and $T_5-T_6$. Outside the transfer phase, the transfer control signal is in an idle phase. In the preferred embodiment, the five intervals $T_1-T_2$, $T_2-T_3$, $T_3-T_4$, $T_4-T_5$, and $T_5-T_6$ are allocated for the transfer of five bits which have the following significance:

Bit 0: indicates that data transmission is from the first IC chip 30 to the second IC chip 34. Thus, during the Bit 0 ($T_1-T_2$) time interval, the first IC chip 30 has control of the data line 300 and uses it to transfer one bit of data to the second IC chip 34.

Bit 1: indicates that data transmission is from the first IC chip 30 to the second IC chip 34.

Bit 2: indicates that data transmission is from the second IC chip 34 to the first IC chip 30.

Bit 3: indicates that data transmission is from the second IC chip 34 to the third IC chip 38.

Bit 4: indicates that data transmission is from the third IC chip 38 to the first IC chip 30.

Thus, the master and slave control units are responsive to the count of synchronization clock signal cycles during a transfer phase to determine and control the provider and receiver of the bit of data transferred during that clock cycle. The above-stated rules for the preferred embodiment therefore may be modified to suit the particular needs of the system. Such modification may include provision of a greater number of intervals for a defined transfer phase of length $T_1-T_N$ to accommodate a different transfer protocol or a greater number of slave IC chips.

When the master control unit 31 in the first IC chip 30 issues the transfer control signal and synchronization clock signal respectively over the signal lines 312 and 313 to the slave control unit 35 in the second IC chip 34 and the slave control unit 39 in the third IC chip 38, it indicates that data transmission can be carried out among the three IC chips 30, 34, 38 according to the values of the bits stated above. Although the above-described synchronization clock signal is issued by the master control unit 31 in the first IC chip 30, someone skilled in the art knows that the synchronization clock signal can also be issued by the other control unit, for example, the slave control unit 35 or slave control unit 39, or by the external circuit 70, which as shown in FIG. 3. At the same time, the master control unit 31 sends the master output control signal over the signal line 310 to the master output encoder 32 so as to set the master output encoder 32 ready for data transmission, and sends the master input control signal over the signal line 311 to the master input decoder 33 so as to set the master input decoder 33 ready for data reception.

Upon receiving the transfer control signal and the synchronization clock signal from the master control unit 31, the slave control unit 35 in the second IC chip 34 sends the slave input control signal over the signal line 351 to the slave input decoder 37 so as to set the slave input decoder 37 ready for data reception, and also sends the slave output control signal over the signal line 350 to the slave output encoder 36 so as to set the slave output encoder 36 ready for data transmission. Similarly in the third IC chip 38, upon receiving the transfer control signal and the synchronization clock signal from the master control unit 31, the slave control unit 39 sends the slave input control signal over the signal line 391 to the slave input decoder 41 so as to set the slave input decoder 41 ready for data reception, and also sends the slave output control signal over the signal line 390 to the slave output encoder 40 so as to set the slave output encoder 40 ready for data transmission. After that, data communication is carried out from one IC chip to the other according to the value of each bit during each period of the transfer phase. Thus, data transfer may continue in this multiplexed fashion as long as the transfer phase is valid.

When data transmission is required, the master output encoder 32 issues a transmission request signal via the signal line 320 to the master control unit 31. Upon receiving the request signal, the master control unit 31 sends out the transfer control signal and the synchronization clock signal as described in the foregoing. When the transfer control signal is in the idle phase, no data transmission can be carried out between the IC chips. If at this time the master output encoder 32 issues no request signal, while the second IC chip 34 has data to transmit, the slave output encoder 36 issues a request signal via the data line 300 to the master control unit 31. After that, the master control unit 31 sends out the transfer control signal asserting the transfer phase and the synchronization clock signal to the slave control unit 35 in the second IC chip 34 and the slave control unit 39 in the third IC chip 38. At the same time, the second IC chip 34 starts data transmission upon detection of the designated bit. Since not every IC chip is requesting data transmission during the designated clock cycle, some of the bits are idle. Similar actions are carried out if the third IC chip 38 has data to transfer while the transfer control signal from the master control unit 31 is in an idle phase.

For instance, if a condition exists such that the first IC chip 30 has two bits of data which are to be transferred to the second IC chip 34, the second IC chip 34 has one bit of data which is to be transferred both to the first IC chip 30 and to the third IC chip 38, and the third IC chip 38 has one bit of data which is to be transferred to the first IC chip 30, then the master control unit 31 sends out the transfer control signal asserting the transfer phase. During the presence of the clock cycle bit 0 and bit 1, the first IC chip 30 transmits the two bits of data successively to the second IC chip 34; during clock cycle bit 2, the second IC chip 34 transmits the one bit of data to the first IC chip 30. During clock cycle bit 3, the second IC chip 34 transmits the one bit of data to the third IC chip 38. Finally, during clock cycle bit 4, the third IC chip 38 transmits the one bit of data to the first IC chip 30. During the time a designated bit is not present, the output encoder and the input decoder on each IC chip is idle so that it does not perform data transmission and reception activities. Data transfer continues as long as the transfer phase is valid.

The synchronization clock signal is set at a high frequency so as to increase the capacity of data transmission among the IC chips during the transfer phase. The effect of the data transmission is equivalent to a parallel transmission.

Figure 5:
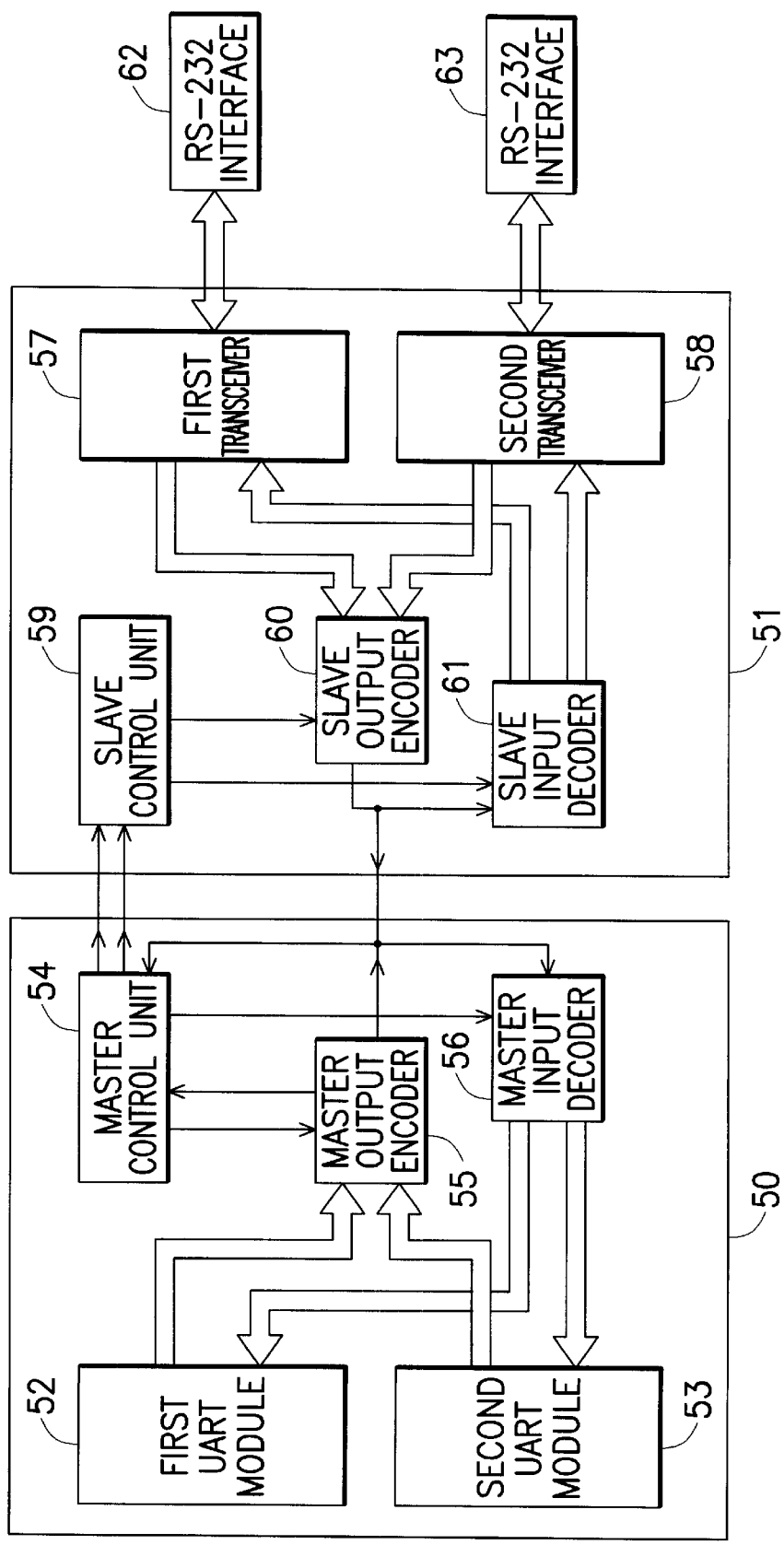
FIG. 5 is a schematic block diagram of an apparatus according to the invention for data communication between two universal asynchronous receiver/transmitter (UART) modules and two transceivers.

FIG. 5 shows a schematic diagram of a chip set utilizing the invention for data communication between a so-called Super I/O chip 50 and a transceiver chip 51 coupled between the Super I/O chip 50 and RS-232 interfaces. More particularly, the invention is used here for control of data communication between two universal asynchronous receiver/transmitter (UART) modules 52, 53 in a first IC chip 50 and two transceivers 57, 58 in a second IC chip 51. The transceivers 57, 58 are connected to respective RS-232 interfaces 62 and 63.

Besides the UART modules 52, 53, the first IC chip 50 includes a master control unit 54, a master output encoder 55, and a master input decoder 56. The second IC chip 51, includes, in addition to the transceivers 57, 58, a slave control unit 59, a slave output encoder 60, and a slave input decoder 61. In a conventional arrangement, the wire connection for data communication between two UART modules in the Super I/O chip and two transceivers in the transceiver chip includes two buses each consisting of 8 signal lines. As a result, a total of 16 signal lines are needed between the two IC chips.

According to the invention, each of the UART modules 52, 53 has three signal output lines, namely DTR (Data Terminal Ready Output), SOUT (Serial Data Output), and RTS (Request To Send Output), connected to the master output encoder 55, and five signal input lines, namely SIN (Serial Data Input), CTS (Clear To Send Input), DSR (Data Set Ready), RI (Ring Indicator), and RLSD (Receiver Line Signal Detect), connected to the master input decoder 56. In the second IC chip 51, each of the transceivers 57, 58 has its three signal output lines DTR, SOUT, and RTS connected to the slave input decoder 61, and its five signal input lines SIN, CTS, DSR, RI, and RLSD connected to the slave output encoder 60.

As for the connection between the master control unit 54, the master output encoder 55, and the master input decoder 56 of the first IC chip 50, and the slave control unit 59, the slave output encoder 60, and the slave input decoder 61 of the second IC chip 51, it is the same both in wiring and function as that described with reference to FIGS. 3 and 4, so that description thereof will not be repeated. It can be seen from FIG. 5 that data communication between the two IC chips 50, 51 requires only three signal lines. Therefore, compared to the prior art, which requires 16 signal lines, the invention represents a significant improvement. The number of pins required for connection of the two IC chips, as well as manufacture cost, therefore can be significantly reduced.

The invention has been described hitherto with exemplary preferred embodiments. However, it is to be understood that the scope of the invention is not limited to the disclosed embodiments. To the contrary, it is intended to cover various modifications and similar arrangements within the scope defined in the following appended claims. The scope of the claims therefore should be accorded the broadest interpretation so as to encompass all such modifications and similar arrangements.

What is claimed is:

1. An apparatus for serial data communication between a first IC chip and a second IC chip, the apparatus receiving a synchronization clock signal from an external circuit, the synchronization clock signal having a plurality of cycle periods, the apparatus comprising:

a transfer request signal generating means located on at least one of the first IC chip and the second IC chip, for generating a transfer request-signal;

a control signal generating means, located on the first IC chip, responsive to the transfer request signal, for generating a transfer control signal;

an input/output control signal generating means, responsive to the plurality of cycle periods of the synchronization clock signal when the transfer control signal is activated, for generating an input/output control signal;

a data transmitting means, located on at least one of the first IC chip and the second IC chip, responsive to the transfer control signal and the input/output control signal, for transmitting data; and a data receiving means, located on at least the other of the at least one of the first IC chip and the second IC chip, responsive to the transfer control signal and the input/output control signal, for receiving the data transmitted by the data transmitting means.

2. The apparatus of claim 1, wherein:

the transfer request signal generating means includes a first transfer request signal generating means located on the first IC chip and a second transfer request signal generating means located on the second IC chip;

the control signal generating means is located on the first IC chip;

the input/output control signal generating means includes a first input/output control signal generating means located on the first IC chip and second input/output control signal generating means located on the second IC chip;

the data transmitting means includes a first data transmitting means located on the first IC chip and a second data transmitting means located on the second IC chip; and the data receiving means includes a first data receiving means located on the first IC chip and second data receiving means located on the second IC chip.

3. The apparatus of claim 2, further comprising:

a transmitter selecting means responsive to the input/output control signal, for selecting between the first data transmitting means and the second data transmitting means and for enabling only the selected data transmitting means to transmit data; and a receiver selecting means responsive to the input/output control signal, for selecting between the first data receiving means and the second data receiving means and for enabling only the selected data receiving means to receive data.

4. The apparatus of claim 2, including a master output decoder, a slave output decoder, a master control unit, a slave control unit, a master input decoder, and slave input decoder, wherein:

the first transfer request signal generating means and the first data transmitting means are included in the master output decoder;

the second transfer request signal generating means and the second data transmitting means are included in the slave output decoder;

the control signal generating means and the first input/output control signal generating means are included in the master control unit;

the second input/output control signal generating means is included in the slave control unit;

the first data receiving means is included in the master input decoder; and the second data receiving means is included in the slave input decoder.

5. The apparatus of claim 4 wherein:

the first input/output control signal generating means includes a master output control signal generating means for generating a master output control signal to control the master output decoder, and a master input control signal generating means for generating a master input control signal to control the master input decoder; and the second input/output control signal generating means includes a slave output control signal generating means for generating a slave output control signal to control the slave output encoder, and a slave input control signal generating means for generating a slave input control signal to control the slave input decoder.

6. The apparatus of claim 5, further comprising:

a transfer signal control line for transferring the transfer control signal from the master control unit to the slave control unit;

a synchronization clock signal line for transferring the synchronization clock signal from the external circuit to the master control unit and the slave control unit; and a data line for passing data from the master output encoder to the slave input decoder, and from the slave output encoder to the master input decoder.

7. The apparatus of claim 5, further comprising:

a transfer signal control line for transferring the transfer control signal from the master control unit to the slave control unit;

a synchronization clock signal line for transferring the synchronization clock signal from the external circuit to the master control unit and the slave control unit; and a data line for passing data from the master output encoder to the slave input decoder, and from the slave output encoder to the master input decoder, and for passing the transfer request signal from the slave output encoder to the master control unit.

8. The apparatus of claim 1, further comprising:

a transfer signal control line for transferring the transfer control signal from the first IC chip to the second IC chip;

a synchronization clock signal line for transferring the synchronization clock signal from the external circuit to the first IC chip and the second IC chip; and a data line for passing data between the first IC chip and the second IC chip.

9. The apparatus of claim 1, further comprising:

a transfer signal control line for transferring the transfer control signal from the first IC chip to the second IC chip;

a synchronization clock signal line for transferring the synchronization clock signal from the external circuit to the first IC chip and the second IC chip; and a data line for passing data between the first IC chip and the second IC chip and for passing the transfer request signal from the second IC chip to the first IC chip.

10. The apparatus of claim 2, further comprising:

a transfer signal control line for transferring the transfer control signal from the first IC chip to the second IC chip;

a synchronization clock signal line for transferring the synchronization clock signal from the external circuit to the first IC chip and the second IC chip; and a data line for passing data between the first IC chip and the second IC chip.

11. The apparatus of claim 2, further comprising:

a transfer signal control line for transferring the transfer control signal from the first IC chip to the second IC chip;

a synchronization clock signal line for transferring the synchronization clock signal from the external circuit to the first IC chip and the second IC chip; and a data line for passing data between the first IC chip and the second IC chip and for passing the transfer request signal from the second IC chip to the first IC chip.

12. The apparatus of claim 4, wherein the transfer control signal is in one a transfer phase, during which data communication between the first and second IC chips is enabled, and an idle phase, during which data communication between the first and second IC chips is not enabled.

13. The apparatus of claim 12, wherein during the active phase, the first and second IC chips are enabled to transmit only one bit of data during any one of the plurality of cycle periods of the synchronization clock signal.

14. The apparatus of claim 13, wherein the master and slave control units are responsive to a count of the cycle periods of the synchronization clock signal during the transfer phase to select between the master output encoder and the slave output encoder and enabling the selected output encoder to transmit data, and to select between the master input decoder and the slave input decoder and enabling the selected input decoder to receive data.

15. An apparatus for serial data communication between a first IC chip and a second IC chip the apparatus comprising:

a transfer request signal generating means, located on at least one of the first IC chip and the second IC chip, for generating a transfer request signal;

a control signal generating means, located on the first IC chip, responsive to the transfer request signal, for generating a transfer control signal;

a first clock signal generating means, located in the first IC chip, responsive to the transfer request signal, for generating a first synchronization clock signal, wherein the first synchronization clock signal has a plurality of cycle periods;

a second clock signal generating means, located in the second IC chip, responsive to the transfer request signal, for generating a second synchronization clock signal, wherein the second signalization clock signal has a plurality of cycle periods and a clock rate of the second synchronization clock signal is different from a clock rate of the first synchronization clock signal;

an input/output control signal generating means, responsive to the plurality of cycle periods selected from one of the first synchronization clock signal and the second synchronization clock signal when the transfer control signal is activated, for generating an input/output control signal;

a data transmitting means, located on at least one of the first IC chip in the second IC chip, responsive to the transfer control signal and the input output control signal, for transmitting data; and a data receiving means, located on at least the other of the at least one of the first IC chip and the second IC chip, responsive to the transfer control signal and the input/output control signal, for receiving the data transmitted by the data transmitting means.

16. The apparatus of claim 15, wherein:

the transfer request generating means includes a first transfer request signal generating means located on the first IC chip and a second transfer request signal generating means located on the second IC chip;

the control signal generating means is located in the first IC chip;

the input/output control signal generating means includes a first input/output control signal generating means located on the first IC chip and a second input output control signal generating means located on the second IC chip, wherein the first input/output control signal generating means and the second input/output control signal generating means are respectively responsive to the plurality of cycle periods of the selected synchronization clock signal when the transfer control signal is activated to generate the input/output control signal;

the data transmitting means includes a first data transmitting means located on the first IC chip and second data transmitting means located on the second IC chip; and the data receiving means includes a first data receiving means located on the first IC chip and second data receiving means located on the second IC chip.

17. The apparatus of claim. 16, further comprising:

a transmitter selection means, responsive to the input/output control signal, for selecting between the first data transmitting means and second data transmitting means and for enabling only the selected data transmitting means to transmit data;

and a receiver selection means, responsive to the input/output control signal, for selecting between the first data receiving means and the second data receiving means and for enabling only the selected data receiving means to receive data.

18. The apparatus of claim 16, including a master output encoder, a slave output encoder, a master control unit, slave control unit, a master input decoder, and slave input decoder, wherein:

the first transfer request signal generating means and the first data transmitting means are included in the master output encoder;

the second transfer request signal generating means and the second data transmitting means are included in the slave output encoder;

the control signal generating means, the first clock signal generating means and the first input/output control signal generating means are included in the master control unit;

the second clock signal generating means and the second input/output control signal generating means are included in the slave control units;

the first data receiving means is included in the master input decoder; and the second data receiving means is included in the slave input decoder.

19. The apparatus of claim 18, wherein:

the first input/output control signal generating means includes a master output control signal generating means for generating a master output control signal to control the master output encoder, and a master input control signal generating means for generating a master input control signal to control the master input decoder; and the second input/output control generating means includes a slave output control generating means for generating a slave output control signal to control a slave output encoder, and a slave input control signal generating means for generating a slave input control signal to control the slave input decoder.

20. The apparatus of claim 19, further comprising:

a transfer signal control line for transferring the transfer control signal from the master control unit to the slave control unit;

a synchronization clock signal line for transferring the selected synchronization clock signal to the master control unit and the slave control unit; and a data line for passing data from the master output encoder to the slave input decoder, and from the slave output encoder to the master input decoder, and for passing the transfer request signal from the slave output encoder to the master control unit.

21. The apparatus of claim 15, further comprising:

a transfer signal control line for transferring the transfer control signal from the first IC chip to the second IC chip;

a synchronization clock signal line for transferring the selected synchronization clock signal to the first IC chip and the second IC chip; and a data line for passing data between the first IC chip and the second IC chip, and for passing the transfer request signal from the second IC chip to the first IC chip.

22. The apparatus of claim 16, further comprising:

a transfer signal control line for transferring the transfer control signal from the first IC chip to the second IC chip;

a synchronization clock signal line for transferring the selected synchronization clock signal to the first IC chip and the second IC chip; and a data line for passing data between the first IC chip and the second IC chip, and for passing the transfer request signal from the second IC chip to the first IC chip.

23. The apparatus of claim 18, wherein the transfer control signal is in one a transfer phase, during which data communication between the first and second IC chips is enabled, and an idle phase, during which data communication between the first and second IC chips is not enabled.

24. The apparatus of claim 23, wherein during the active phase, the first and second IC chips are enabled to transmit only one bit of data during any one of the plurality of cycle periods of the synchronization clock signal.

25. The apparatus of claim 24, wherein the master and slave control units are responsive to a count of the cycle periods of the synchronization clock signal during the transfer phase to select between the master output encoder and the slave output encoder and enabling the selected output encoder to transmit data, and to select between the master input decoder and the slave input decoder and enabling the selected input decoder to receive data.

26. A method for serial data communication between a first IC chip and a second IC chip, comprising:

generating a transfer request signal;

generating, at the first IC chip, a transfer control signal in response to the transfer request signal;

generating an input/output control signal in response to a synchronization clock signal when the transfer control signal is activated, wherein the synchronization clock signal has a plurality of cycle periods, and wherein the transfer control signal has a first value when activated and a second value, different from the first value, when not activated;

transmitting data in response to the input/output control signal; and receiving the data transmitted in response to the input/output control signal.

* * * * *